(12) United States Patent
Chang et al.

(10) Patent No.: US 6,421,084 B1
(45) Date of Patent: Jul. 16, 2002

(54) METHOD FOR INTERPOLATING A FULL COLOR IMAGE FROM A SINGLE SENSOR USING MULTIPLE THRESHOLD-BASED GRADIENTS

(75) Inventors: Edward T. Chang, Cambridge; Shiufun Cheung, Waltham; Davis Pan, Arlington, all of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/033,346

(22) Filed: Mar. 2, 1998

(51) Int. Cl.$^7$ ................................................ H04N 9/73
(52) U.S. Cl. ...................................... 348/273; 348/223
(58) Field of Search ................................ 348/207, 222, 348/231, 232, 272, 273, 266, 280, 281, 282, 223; 358/518–520, 521; H04N 9/73

(56) References Cited

U.S. PATENT DOCUMENTS

| | | | | |
|---|---|---|---|---|
| 5,382,976 A | * | 1/1995 | Hibbard | 348/273 |
| 5,821,999 A | * | 10/1998 | Barnsley et al. | 348/272 |
| 5,990,950 A | * | 11/1999 | Addison | 348/273 |
| 6,295,087 B1 | * | 9/2001 | Nohda | 348/234 |

* cited by examiner

Primary Examiner—Tuan Ho
(74) Attorney, Agent, or Firm—Cesari and McKenna, LLP; Edwin H. Paul, Esq.

(57) ABSTRACT

A digital imaging system is provided for interpolating a full color image from a camera having an array of single color sensors. Measured color values are stored as an array of data elements in a memory of the system. Each data element corresponds to the measured color value from one sensor. A set of gradient values is determined for each data element at a specific location in the array. The gradient values correspond to color value differences in a plurality of directions from the data element. From the set of gradient values, a threshold value is determined. Using the threshold value, a subset of gradient values is selected so that the members of the subset have gradient values less than the threshold. Additional color values for each data element are interpolated according to the subset of gradient values.

10 Claims, 5 Drawing Sheets

| g1 | b1 | g2 | b2 | g3 |
|----|----|----|----|----|
| r1 | g4 | r2 | g5 | r3 |
| g6 | b3 | g7 | b4 | g8 |
| r4 | g9 | r5 | g10 | r6 |
| g11 | b5 | g12 | b6 | g13 |

FIG. 2

| r1 | g1 | r2 | g2 | r3 |
|----|----|----|----|-----|
| g3 | b1 | g4 | b2 | g5 |
| r4 | g6 | r5 | g7 | r6 |
| g8 | b3 | g9 | b4 | g10 |
| r7 | g11 | r8 | g12 | r9 |

METHOD FOR INTERPOLATING A FULL COLOR IMAGE FROM A SINGLE SENSOR USING MULTIPLE THRESHOLD-BASED GRADIENTS

FIELD OF THE INVENTION

This invention relates generally to the field of digital imaging, and more particularly to generating digital representations of full color images.

BACKGROUND OF THE INVENTION

In a single sensor camera, varying intensities of electromagnetic radiation are measured at an image plane composed of a rectangular array of sensor elements. If the radiation is visible light, then a gray-scale image is produced. In order to construct a full color image, a Bayer color filter array (CFA) can be placed between the lens and the sensors at the image plane. A CFA has one color filter element for each sensor. For a more detailed description, see U.S. Pat. No. 3,971,065 to Bayer.

Usually, at least three different colors are used for the filter elements of the CFA, for example, red, green, and blue (RGB). These three colors are sufficient to recover all colors in the visible light part of the electromagnetic spectrum. However, because each sensor can only measure the intensity of a single color, interpolation is required to recover a full color image from the sparsely sampled image plane.

In most color cameras, one of the colors is sampled more frequently. For example, with the Bayer CFA, the image plane is partitioned in blocks of four sensors having the pattern:

G R

B G

There are two green sensors on one diagonal, and a red and blue sensor on the other. The dominant color is green because green has the maximum sensitivity in the human eye. Therefore green is used to represent high frequency detail.

The measured intensity of the green sensors may be used to determine the overall luminance of the image using simple bilinear interpolation. Then, after the luminance has been determined, the full RGB color values at each location in the image can be interpolated from the chrominance values of neighboring sensors. Such a method is disclosed in U.S. Pat. No. 4,642,678. As a disadvantage, simple bilinear interpolation is prone to color edge artifacts.

In order to minimize this problem, adaptive color plan interpolation has been disclosed in U.S. Pat. No. 5,373,322 to Laroche. There, the gradients of luminance values are determined in the horizontal and vertical directions. The gradient values in these two directions are compared and a single preferred direction is selected. The additional color values at a particular location are interpolated from nearby sensors located in the preferred direction.

In U.S. Pat. No. 5,627,734 to Hamilton, a single preferred direction is selected by using a classifier. The classifier is computed by adding LaPlacian second-order values to the gradient values. Then, like Laroche above, the single direction is used to perform the interpolation.

There is a problem with choosing only a single direction, either horizontal or vertical, for interpolation. In real images, there may be edges which are not predominantly vertical or horizontal. In addition, the image may have many fine detailed features without a specific single directional orientation of the gradient. Therefore, it is desired to provide a method for interpolating additional color values at locations of the image that do not have a single directional gradient bias.

SUMMARY OF THE INVENTION

In a digital imaging system, a method and apparatus are provided for interpolating a full color image from a camera having an array of single color sensors. Each sensor measures a single color value, for example, red, green, or blue. The measured color values are stored as an array of data elements in a memory of the system. The location of the data elements in the array correspond to the location of the sensors at the image plane of the camera.

Using color differencing, a set of gradient values is determined for each data element at a specific location in the array. The gradient values correspond to color value differences in a plurality of directions from the data element. Color values are differenced for a smaller fixed sized array centered on each data element.

From the set of gradient values, a threshold value is determined. The threshold can be based on a maximum and minimum gradient of the set. Using the threshold value, a subset of gradient values is selected so that the members of the subset have gradient values less than the threshold. The directions associated with the selected set identify a region where color values are similar. Additional color values for each data element can then be interpolated according to the subset of gradient values.

BRIEF DESCRIPTION OF THE DRAWINGS

FIG. 2 is a five-by-five array of data elements stored in a memory having single color values, centered on a green data element, with red elements directly above and below the center green element;

FIG. 5 is a five-by-five array of data elements stored in a memory having single color values, centered on a red data element.

DETAILED DESCRIPTION OF PREFERRED EMBODIMENTS

Figure 1:
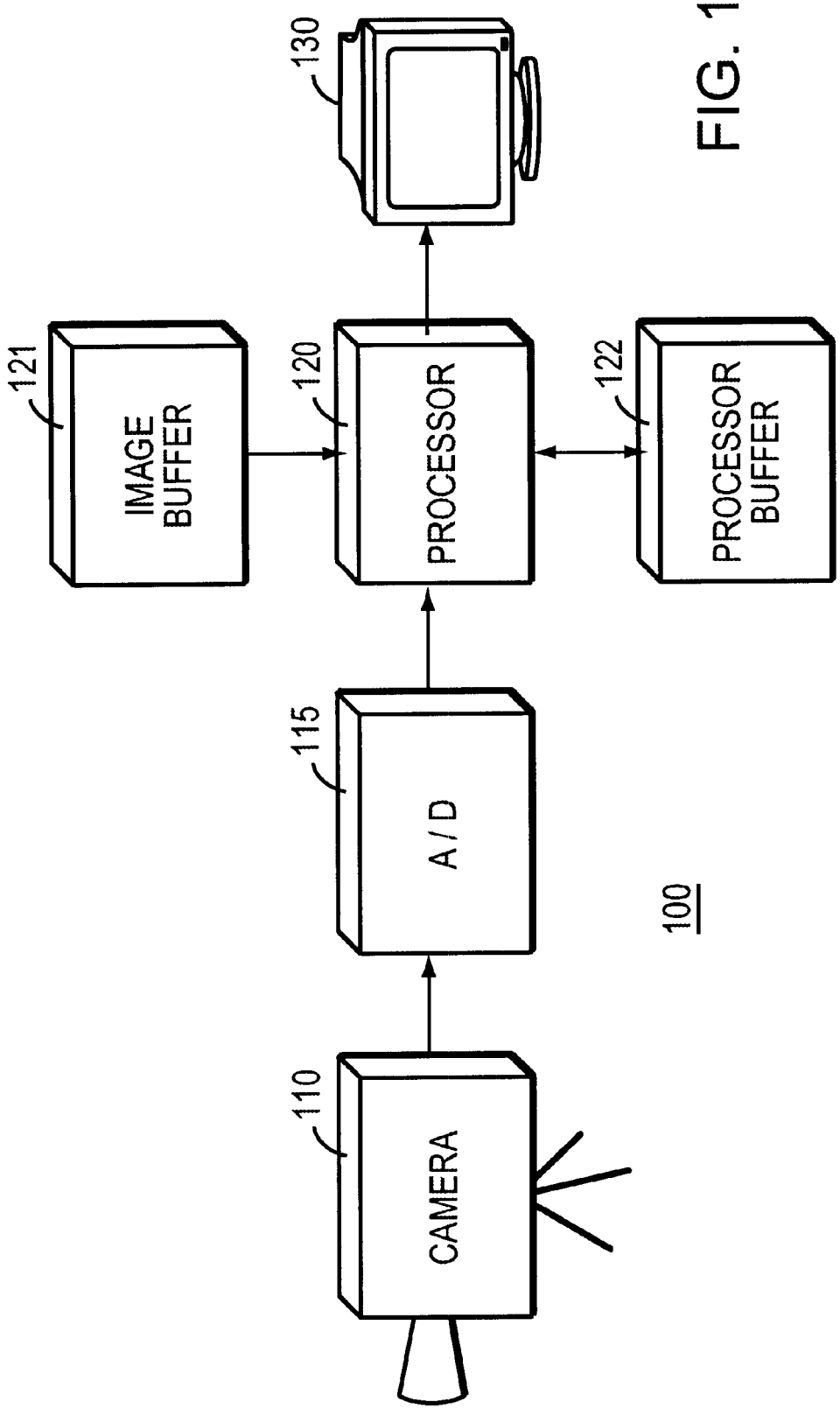
FIG. 1 is a block diagram of a digital imaging system that uses the invention.

FIG. 1 shows an image processing system 100 that uses multiple threshold-based gradients to determine a full color image according to the invention. The system 100 includes a single sensor camera 110, a digital processor 120, and a display device 130. If the camera 110 is an analog device, then a analog to digital converter (A/D) 115 is used to convert the measured signals to digital signals. The system 100 also includes an image buffer 121 and a processor buffer 122. The buffers 121–122 can be made of conventional memories.

During operation of the system 100, the camera 110 measures light signals with a regular array of sensor elements placed at the image plane, e.g., charge-coupled devices (CCD). The sensors are overlaid with a color filter array (CFA) to produce measured values for the colors red, green, and blue. Each CCD sensor measures one color. The measured color values are stored in the image buffer 121 as an array of data elements, i.e., a "frame." The data elements representing the color values at the image plane are operated on by the processor 120 using the processor buffer 122. The processed color values can be rendered on the screen of the display device 130 as a full color image. In the art, the fundamental units associated with the individual color values in the arrays are generally known as pixels, for example, the sensors, the data elements, or the display screen locations.

As an introduction to the invention, a full color image is interpolated from color values measured by a single sensor camera. The camera 110 measures only a single color value at each pixel location. The color values are stored in the image buffer 121 as a frame.

The goal of the invention is to recover the missing color values at each location, given only a single color value at each location. FIGS. 2, 3, 4, and 5 show the data elements used in this recovery process. FIG. 2 shows a five-by-five array 200 of data elements of the image plane as represented in the image buffer 121. As can be seen, each pixel stores a color value for a single color, e.g., red, green, and blue (RGB). The green 201, e.g., g1, g2, ..., g13, are arranged along one diagonal of the array, and the red and blue pixels 202–203 are arranged along the other diagonal, e.g., r1, b1, r2, b2, etc. The pixel under consideration, the center pixel of the five-by-five array, is green. Therefore the missing color values are blue and red.

Figure 3:
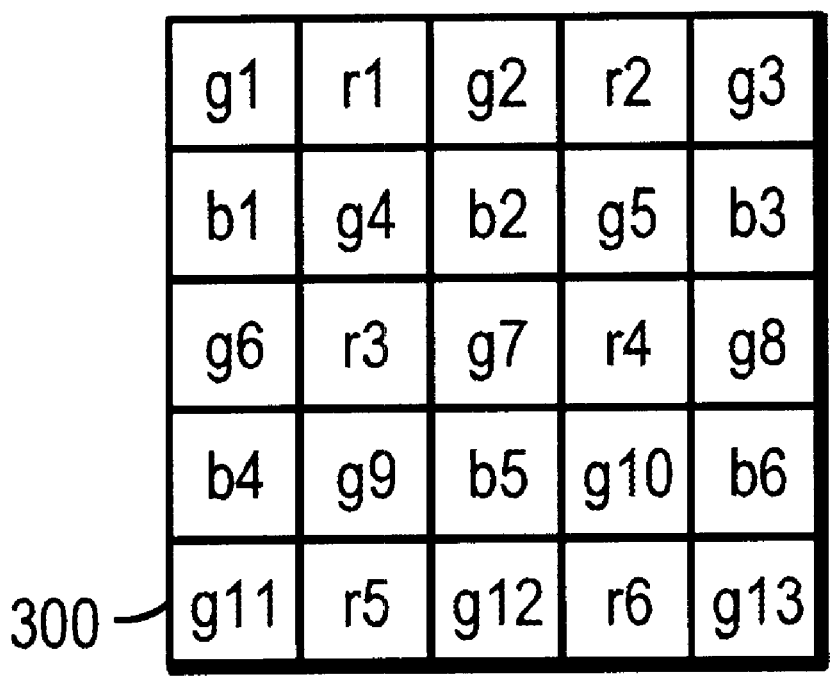
FIG. 3 is a five-by-five array of data elements stored in a memory having single color values, centered on a green data element, with blue elements directly above and below the center green element.
Figure 4:
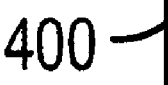
FIG. 4 is a five-by-five array of data elements stored in a memory having single color values, centered on a blue data element.

FIG. 3 shows a similar five-by-five array 300 of data elements of the image plane, except that the blue and red pixels are reversed from FIG. 2. FIG. 4 shows a similar five-by-five array 400 of data elements of the image plane, except that the center pixel is blue, so the missing color values are green and red. FIG. 5 shows another similar five-by-five array 500 of data elements of the image plane, except that the center pixel is red, so the missing color values are green and blue. In each of the FIGS. 2, 3, 4, and 5, the goal is to recover the missing color values at the center pixel of the five-by-five array.

For each pixel, the missing color components are found as follows. First, a set of gradients is determined from the neighboring color values in the five-by-five array centered at a particular pixel. Each gradient corresponds to a different direction. Second, for each set of gradients, a threshold value is determined, and the threshold is used to select a subset of gradients. Low valued gradients are preferred because they indicate pixels having similar color values. High gradients would be expected in regions of the image where there are many fine details, or sharp edges.

Third, the subset of gradients is then used to locate regions of pixels that are most like the pixel under consideration. Note, here the pixels in the identified regions can be in different directions from the pixel under consideration, in contrast with the prior art where color values located in only a single direction are used for interpolation. The pixels in the regions are then weighted and summed to determine the average difference between the color of the actual measured center pixel value and the missing color.

We now described those steps for the case in which the pixel under consideration is green, and the missing value is blue. Note that there are six separate cases, all of which use the same conceptual algorithm:

Case 1: consider green, missing blue;
Case 2: consider green, missing red;
Case 3: consider blue, missing green;
Case 4: consider blue, missing red;
Case 5: consider red, missing green; and
Case 6: consider red, missing blue.

To recover all of the missing color values in the image would require the application of the following:

For each green pixel, Cases 1 and 2 must be performed.
For each blue pixel, Cases 3 and 4 must be performed.
For each red pixel, Cases 5 and 6 must be performed.

Below, we describe only the first case with the understanding that the other five cases are solved in a similar manner.

To demonstrate the case of considering a green pixel and recovering the missing blue value, we use FIG. 2, since it portrays a five-by-five array centered on a green pixel. The first step is to determine a set of gradients. In the preferred implementation, we consider a set of eight gradients, although that number can be changed. We choose eight gradients in the following eight compass point directions: N, NE, E, SE, S, SW, W, NW. To determine the gradients, we weight and sum the absolute values of the differences between pairs of similar-colored pixels as follows:

Gradient $N = |r2-r5| + |g2-g7| + |g4-g9|/2 + |g5-g10|/2 + |b1-b3|/2 + |b2-b4|/2$ Gradient $E = |b4-b3| + |g8-g7| + |g5-g4|/2 + |g10-g9|/2 + |r3-r2|/2 + |r6-r5|/2$ Gradient $S = |r5-r2| + |g12-g7| + |g9-g4|/2 + |g10-g5|/2 + |b5-b3|/2 + |b6-b4|/2$ Gradient $W = |b3-b4| + |g6-g7| + |g4-g5|/2 + |g9-g10|/2 + |r1-r2|/2 + |r4-r5|/2$ Gradient $NE = |g5-g9| + |g3-g7| + |b2-b3| + |r5|$ Gradient $SE = |g10-g4| + |g13-g7| + |b6-b3| + |r6-r2|$ Gradient $NW = |g4-g10| + |g1-g7| + |b1-b4| + |r1-r5|$ Gradient $SW = |g9-g5| + |g11-g7| + |b5-b4| + |r4-r2|$ We note that for a green pixel under consideration, it is possible for the pixels directly above and below to be blue instead of red. In this case, we use FIG. 3 and switch the r's and b's in the above eight gradient calculations.

For example purposes, let us assume the following numerical values of our eight gradients: 12, 13, 7, 8, 4, 7, 12, 14, i.e., Gradient N=12
Gradient E=13
Gradient S=7
Gradient W=8
Gradient NE=4
Gradient SE=7
Gradient NW=12
Gradient SW=14

The second step is to determine a threshold and select a subset of gradients. In the preferred implementation, we determine a threshold as follows. Let the maximum gradient value be denoted as Max, and let the minimum gradient value be denoted as Min. Then we determine our threshold T as follows:

$$T = (1.5 \times Min) + [0.5 \times (Max + Min)]$$

Using the threshold value T, a subset of gradients is selected such that all gradients in the subset are less than the threshold T. Using the numerical values in the above example, Max=14, Min=4, and T is determined to be 11. Thus, the selected subset of gradients less than 11:

Subset($g7$)={S=7, W=8, NE=4, SE=7}

The third step is to locate pixels in the regions corresponding to the subset of gradients, and to use those pixels to determine a color difference. In the example above, we determine the average blue and green values in the gradient subset regions as follows. Let the average green value in the region be denoted as G, and let the average blue value in a region be denoted as B. Then, in the gradient subset regions the average values are determined as follows:

S: G=(g12+g7)/2;
W: G=(g6 +g7)/2
NE: G=g5;
SE G=g10;
B=(b3+b4 +b5 +b6)/2;
B=b3;
B=(b2+b4)/2
B=(b4+b6)/2.

The above G values are added together to produce a total G, denoted by $G_{sum}$. Likewise, the above B values are added to each other to produce a total B denoted by $B_{sum}$. Then, the difference of the two sums, $B_{sum}-G_{sum}$, is divided by the number of gradients in the threshold subset to produce a normalized color difference, $BG_{diff}$. This difference is added to the pixel value under consideration, e.g., g7, to produce an estimate for the missing blue value.

It should be apparent that other formulations can be used to determine the threshold values used for selecting interpolation directions. What is important here is that interpolation is based on pixels in a region defined by multiple directions, and not a single direction as in the prior art. The method can also be used to determine sets of gradient values for any colored pixel, that is, red and blue pixels, as well as green pixels. As an advantage, a high resolution, full color image is produced.

It is understood that the above-described embodiments are simply illustrative of the principles of the invention. Various other modifications and changes may be made by those skilled in the art which will embody the principles of the invention and fall within the spirit and scope thereof.

We claim:

1. A computerized method for interpolating a full color image from a camera having an array of sensors, each sensor generating only one color value, comprising the steps of:

storing the generated color values in a memory as an array of data elements, each data element corresponding to one sensor;

determining a set of gradient values for each data element, the gradient values corresponding to color value differences in a plurality of at least eight directions from the data element;

determining a threshold value for each set of gradient values;

selecting a subset of gradient values from each set according to the threshold value, the subset of gradient values corresponding to a set of preferred directions for interpolating additional color values for the data element; and interpolating the additional color values for each data element from color values of nearby elements selected according to the subset of gradient values to agree with the set of preferred directions.

2. The method of claim 1 wherein the gradient values are determined by differencing color value pairs for a particular color in each of the plurality of at least eight different directions.

3. The method of claim 2 wherein the array size is five by five and wherein each of the at least eight directions define a plurality of lines in the corresponding directions and where some of these lines do not intersect the data element for which the color is being calculated.

4. The method of claim 1 wherein the threshold value is based on a maximum gradient value and a minimum gradient value of each set.

5. The method of claim 4 wherein the selected subset of gradient values are less than the threshold value.

6. The method of claim 1 wherein the selected subset of gradient values includes gradient values for at least two directions.

7. The method of claim 1 wherein the set of gradient values for a particular data element is determined from fixed size array of data elements centered at the particular data element.

8. The method of claim 7 wherein the fixed size array is five by five data elements.

9. An apparatus for interpolating a full color image from a camera having an array of sensors, each sensor generating only one color value, comprising:

an image buffer storing the generated color values as an array of data elements, each data element corresponding to one sensor;

means for determining a set of gradient values for each data element, the gradient values corresponding to color value differences in a plurality of at least eight directions from the data element;

means for determining a threshold value for each set of gradient values;

means responsive to the threshold value for selecting a subset of gradient values from each set according to the threshold value, the subset of gradient values corresponding to a set of preferred directions for interpolating additional color values for the data element; and means for interpolating the additional color values for each data element from color values of nearby elements selected according to the subset of gradient values to agree with the set of preferred directions.

10. The method of claim 4 wherein the threshold value is determined by a arithmetic function of the maximum and the minimum gradient values of each set of gradients.

* * * * *